O. C. McCUNE.
Corn-Planter.
No. 56,969.
Patented Aug. 7. 1866.
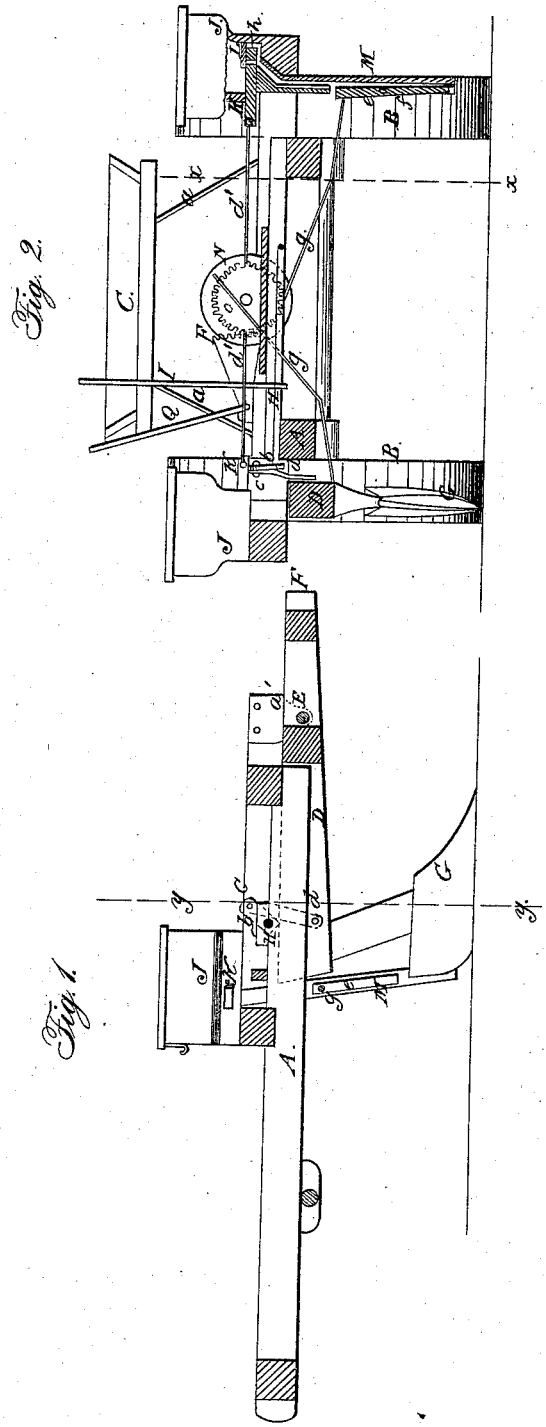
Witnesses:
Inventor:

UNITED STATES PATENT OFFICE.

O. C. McCUNE, OF DARBY CREEK, OHIO.

IMPROVEMENT IN CORN-PLANTERS.

Specification forming part of Letters Patent No. 56,969, dated August 7, 1866.

*To all whom it may concern:*

Be it known that I, O. C. McCUNE, of Darby Creek, in the county of Madison and State of Ohio, have invented a new and Improved Corn-Planter; and I do hereby declare that the following is a full, clear, and exact description thereof, which will enable those skilled in the art to make and use the same, reference being had to the accompanying drawings, forming part of this specification, in which—

Figure 1 is a side sectional view of my invention taken in the line $x\ x$, Fig. 2; Fig. 2, a transverse vertical section of the same taken in the line $y\ y$, Fig. 1.

Similar letters of reference indicate corresponding parts.

This invention relates to a new and improved device for planting corn in hills in check-rows; and it consists in a novel manner for operating the seed slides and valves.

A represents a rectangular frame, which is mounted on two wheels, B B, the latter being at the rear part of the former. C is the driver's seat, placed on standards $a$ at the rear part of the frame A.

D is a supplemental frame, which is also of rectangular form, and is fitted loosely on a rod or shaft, E, the ends of which are secured to pendants $a'\ a'$, at the front part of frame A. This frame D has the draft-pole F attached to it, and the furrow-openers or plows G G are at its rear end, one at each side.

H is a shaft having its bearings on the frame A, with a crank, $b$, at each end, said cranks being connected by pivots $c$ at their outer ends to arms $d$, attached to the rear part of frame D. The shaft H has a lever, I, attached to it, by actuating which the plows G G may be raised out of the ground when necessary—as, for instance, in turning at the ends of a field or drawing the device from place to place.

On the frame A, at each side, there is placed a seed box or hopper, J, each having a perforated slide, K, within it, working under a cut-off, L. (See Fig. 2.) M represents the tubes, which convey the seed, as it is discharged from the hoppers J, to the furrows made by the plows G.

The slides K K are connected by rods $d'\ d'$ to wheel N, the axis of which is on the frame A, the rods $d'$ being attached to the wheel near its edge at opposite sides of the axis. At the rear side of the wheel N, and concentric with it, there is a pinion, O, into which a toothed segment, P, gears, the latter being also attached to frame A and having a lever, Q. By actuating this segment P through the medium of lever Q the wheel N will will be turned and the slides K K operated, having reciprocating motion imparted to them.

In each tube M there is fitted a valve, $e$, which works on a pivot, $f$. These valves are connected at their upper ends by rods $g$ with the wheel N, and in such position relatively with the rods $d'$ that when the slides K are shoved under the cut-offs L, and their holes $h$ are in line with the tubes M, the lower ends of the valves $e$ will catch and retain the seed in the tubes, and when the slides K are moved in the opposite direction and the holes $h$ drawn out from underneath the cut-offs, for the purpose of being refilled, the lower ends of the valves will open to let the seed fall into the furrows made by the plows G G. The seed, therefore, is dropped from the lower ends of the tubes M, and consequently without being unduly scattered, and it will be quickly dropped on account of the short distance the seed has to fall. Hence the seed will be planted with accuracy and in check-rows, so that the corn may be plowed both ways and cultivated with facility.

I do not claim, broadly, opening and closing simultaneously two valves, one near the ground and the other connected with the hopper; but What I do claim as new, and desire to secure by Letters Patent, is—

The combination of the lever Q, toothed segment P, pinion O, wheel N, slides K, and valves $e$, all arranged as and for the purposes set forth.

O. C. McCUNE.

Witnesses:
 W. P. ANDREWS,
 NELSON C. ADAMS.